(12) United States Patent
Matsumura et al.

(10) Patent No.: US 12,477,560 B2
(45) Date of Patent: Nov. 18, 2025

(54) TERMINAL, RADIO COMMUNICATION METHOD, AND BASE STATION

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Weiqi Sun, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 350 days.

(21) Appl. No.: 18/031,270

(22) PCT Filed: Oct. 15, 2020

(86) PCT No.: PCT/JP2020/038952
§ 371 (c)(1),
(2) Date: Apr. 11, 2023

(87) PCT Pub. No.: WO2022/079859
PCT Pub. Date: Apr. 21, 2022

(65) Prior Publication Data
US 2023/0379932 A1    Nov. 23, 2023

(51) Int. Cl.
*H04W 72/231* (2023.01)
*H04W 72/1263* (2023.01)

(52) U.S. Cl.
CPC ..... *H04W 72/231* (2023.01); *H04W 72/1263* (2013.01)

(58) Field of Classification Search
CPC ........... H04W 72/231; H04W 72/1263; H04W 72/23; H04L 5/001; H04L 5/0048; H04L 5/0051; H04L 5/0094
USPC .................................................. 370/329–330
See application file for complete search history.

(56) References Cited

U.S. PATENT DOCUMENTS

| | | | | |
|---|---|---|---|---|
| 2020/0100276 | A1* | 3/2020 | Oh | H04W 16/14 |
| 2021/0314953 | A1* | 10/2021 | Park | H04L 5/0091 |
| 2023/0078723 | A1* | 3/2023 | Kim | H04W 74/0816 |
| | | | | 370/329 |

OTHER PUBLICATIONS

Office Action issued in Japanese Patent Application No. 2022-556777, mailed on Dec. 24, 2024 (8 pages).
International Search Report issued in PCT/JP2020/038952 on May 11, 2021 (1 page).
Written Opinion of the International Searching Authority issued in PCT/JP2020/038952 on May 11, 2021 (4 pages).
NTT Docomo, Inc.; "Discussion on multi-beam operation"; 3GPP TSG RAN WG1 Meeting #102-e, R1-2006951; e-Meeting; Aug. 17-28, 2020 (14 pages).

(Continued)

*Primary Examiner* — Candal Elpenord
(74) *Attorney, Agent, or Firm* — Osha Bergman Watanabe & Burton LLP

(57) ABSTRACT

A terminal according to one aspect of the present disclosure includes a receiving section that receives first downlink control information indicating a transmission configuration indication (TCI) state applicable to multiple types of channels, and a control section that applies the TCI state to the multiple types of channels after timing at which specific time passes from an end of operation for any one of transmission of an uplink channel based on the first downlink control information and reception of second downlink control information after the first downlink control information. According to one aspect of the present disclosure, it is possible to appropriately determine information related to QCL.

6 Claims, 17 Drawing Sheets

(56) References Cited

OTHER PUBLICATIONS

ZTE; "Enhancements on Multi-beam Operation"; 3GPP TSG RAN WG1 Meeting #102-e, R1-2005454; e-Meeting; Aug. 17-28, 2020 (11 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

TERMINAL, RADIO COMMUNICATION METHOD, AND BASE STATION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a user terminal (terminal, User Equipment (UE)) that controls transmission/reception processing based on information related to quasi-co-location (QCL) (QCL assumption/Transmission Configuration Indication (TCI) state/spatial relation) is under study.

However, there is a case where the information related to the QCL is indefinite. Unless the information related to the QCL is definite, communication quality reduction, throughput reduction, and the like may occur.

Thus, an object of the present disclosure is to provide a terminal, a radio communication method, and a base station that appropriately determine information related to QCL.

Solution to Problem

A terminal according to one aspect of the present disclosure includes a receiving section that receives first downlink control information indicating a transmission configuration indication (TCI) state applicable to multiple types of channels, and a control section that applies the TCI state to the multiple types of channels after timing at which specific time passes from an end of operation for any one of transmission of an uplink channel based on the first downlink control information and reception of second downlink control information after the first downlink control information.

Advantageous Effects of Invention

According to one aspect of the present disclosure, information related to QCL can be appropriately determined.

Figure 1:
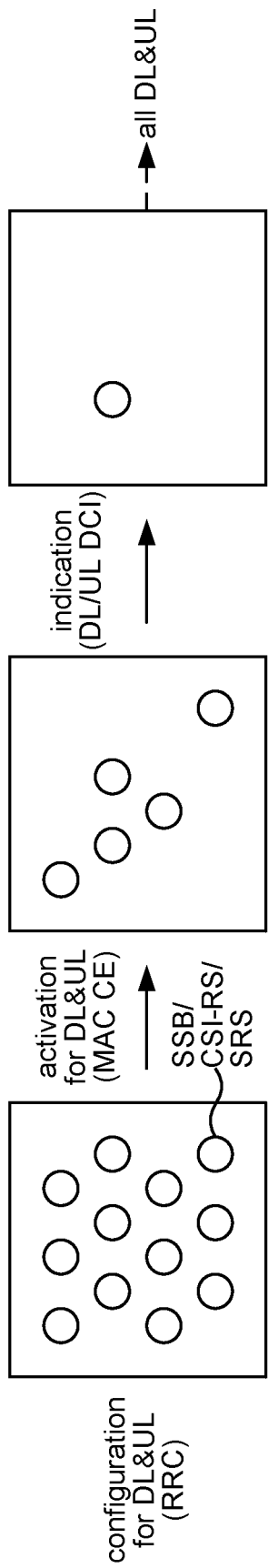
FIG. 1 is a diagram to show an example of a common beam for both DL and UL.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. The equivalent of the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may mean that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter(s)) are described below:

QCL type A (QCL-A): Doppler shift, Doppler spread, average delay, and delay spread
QCL type B (QCL-B): Doppler shift and Doppler spread
QCL type C (QCL-C): Doppler shift and average delay
QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X of a TCI state may mean an RS to have a relationship of QCL type X with (a DMRS of) a certain channel/signal, and this RS may be referred to as a QCL source of QCL type X in the TCI state.

(Pathloss RS)

Pathloss $PL_{b,f,c}(q_d)$ [dB] in transmit power control for each of the PUSCH, PUCCH, and SRS is calculated by the UE with index $q_d$ of a reference signal (RS, pathloss reference RS (PathlossReferenceRS)) for a downlink BWP associated with active UL BWP b for carrier f in serving cell c.

In the present disclosure, the pathloss reference RS, a pathloss (PL)-RS, index $q_d$, an RS used for pathloss calculation, and an RS resource used for pathloss calculation may be interchangeably interpreted. In the present disclosure, calculate, estimate, measure, and track may be interchangeably interpreted.

Whether an existing system for higher layer filtered RSRP for pathloss measurement is changed when the pathloss RS is updated by a MAC CE is under study.

When the pathloss RS is updated by the MAC CE, pathloss measurement based on L1-RSRP may be applied. At an available timing after the MAC CE for updating the pathloss RS, higher layer filtered RSRP may be used for pathloss measurement, and L1-RSRP may be used for pathloss measurement before the higher layer filtered RSRP is applied. At an available timing after the MAC CE for updating the pathloss RS, higher layer filtered RSRP may be used for pathloss measurement, and higher layer filtered RSRP for a previous pathloss RS may be used before that timing. The higher layer filtered RSRP may be used for pathloss measurement in a manner similar to that of operation in Rel. 15, and the UE may track all pathloss RS candidates configured by RRC. A maximum number of pathloss RSs configurable by the RRC may depend on a UE capability. When the maximum number of pathloss RSs configurable by the RRC is X, pathloss RS candidates being X or less may be configured by the RRC, and a path loss RS may be selected by the MAC CE from the configured pathloss RS candidates. The maximum number of pathloss RSs configurable by the RRC may be 4, 8, 16, 64, or the like.

In the present disclosure, the higher layer filtered RSRP, filtered RSRP, and layer 3 filtered RSRP may be interchangeably interpreted.

(Default TCI State/Default Spatial Relation/Default PL-RS)

In an RRC connected mode, in both a case where information of TCI in DCI (higher layer parameter TCI-PresentInDCI) is set to "enabled" and a case where the information of TCI in DCI is not configured, when time offset between reception of DL DCI (DCI to schedule a PDSCH) and a corresponding PDSCH (PDSCH scheduled by the DCI) is less than a threshold value (timeDurationForQCL) (application condition, first condition), and in a case of non-cross carrier scheduling, a TCI state (default TCI state) for the PDSCH may be a TCI state with the lowest CORESET ID in the latest slot in an active DL BWP for that CC (for a specific UL signal). Otherwise, the TCI state (default TCI state) for the PDSCH may be a TCI state with the lowest TCI state ID of a PDSCH in an active DL BWP for a scheduled CC.

In Rel. 15, individual MAC CEs for a MAC CE for activation/deactivation of PUCCH spatial relation and a MAC CE for activation/deactivation of SRS spatial relation are necessary. A PUSCH spatial relation follows the SRS spatial relation.

In Rel. 16, at least one of the MAC CE for activation/deactivation of PUCCH spatial relation and the MAC CE for activation/deactivation of SRS spatial relation may not be used.

If both a spatial relation and a PL-RS are not configured for a PUCCH in FR2 (application condition, second condition), default assumption for the spatial relation and PL-RS (default spatial relation and default PL-RS) is applied to the PUCCH. If both a spatial relation and a PL-RS are not configured for an SRS (SRS resource for the SRS or SRS resource corresponding to SRI in DCI format 0_1 to schedule a PUSCH) in FR2 (application condition, second condition), default assumption for the spatial relation and PL- RS (default spatial relation and default PL-RS) is applied to the PUSCH scheduled by DCI format 0_1, and the SRS.

If a CORESET is configured in an active DL BWP on that CC (application condition), the default spatial relation and default PL-RS may be a TCI state or QCL assumption for a CORESET having the lowest CORESET ID in the active DL BWP. If a CORESET is not configured in the active DL BWP on that CC, the default spatial relation and default PL-RS may be an active TCI state having the lowest ID for a PDSCH in the active DL BWP.

In Rel. 15, a spatial relation for a PUSCH scheduled by DCI format 0_0 follows a spatial relation for a PUCCH resource having the lowest PUCCH resource ID, out of active spatial relations for PUCCHs on the same CC. A network needs to update PUCCH spatial relations on all SCells even when the PUCCH is not transmitted on the SCell.

In Rel. 16, PUCCH configuration for the PUSCH scheduled by DCI format 0_0 is unnecessary. When an active PUCCH spatial relation or a PUCCH resource for the PUSCH scheduled by DCI format 0_0 is absent on an active UL BWP in that CC (application condition, second condition), the default spatial relation and default PL-RS are applied to the PUSCH.

A condition for application of the default spatial relation/default PL-RS for the SRS may include a case that an information element for enabling a default beam pathloss for the SRS (higher layer parameter enableDefaultBeamPlForSRS) is set to "enabled." A condition for application of the default spatial relation/default PL-RS for the PUCCH may include a case that an information element for enabling a default beam pathloss for the PUCCH (higher layer parameter enableDefaultBeamPlForPUCCH) is set to "enabled." A condition for application of the default spatial relation/default PL-RS for the PUSCH scheduled by DCI format 0_0 may include a case that an information element for enabling a default beam pathloss for the PUSCH scheduled by DCI format 0_0 (higher layer parameter enableDefaultBeamPlForPUSCH0_0) is set to "enabled."

The above-described threshold value may be referred to as a time length (time duration) for QCL, "timeDurationForQCL," "Threshold," "Threshold for offset between a DCI indicating a TCI state and a PDSCH scheduled by the DCI," "Threshold-Sched-Offset," a schedule offset threshold value, a scheduling offset threshold value, or the like.

(Unified/Common TCI Framework)

According to a unified TCI framework, UL and DL channels can be controlled by a common framework. Instead of defining a TCI state or a spatial relation for each channel in a manner similar to that of Rel. 15, the unified TCI framework may indicate a common beam and apply the common beam to all UL and DL channels, or may apply a UL common beam to all UL channels and apply a DL common beam to all DL channels.

One common beam for both DL and UL or a DL common beam and a UL common beam (two common beams in total) are under study.

The UE may assume the same TCI state (joint TCI state, joint TCI state pool, joint common TCI state pool) for the UL and DL.

In an example of FIG. 1, RRC configures a plurality of TCI states (joint common TCI state pool) for both of the DL and UL. Each of the plurality of TCI states may be an SSB, a CSI-RS, or an SRS. A MAC CE may activate some of the plurality of configured TCI states. DCI may indicate at least one of the plurality of activated TCI states.

Default beams for the UL and DL may be unified by MAC CE-based beam management (MAC CE-level beam indication). The default beams may be unified with a default UL beam (spatial relation) by updating a default TCI state for the PDSCH.

A common beam/unified TCI state may be indicated from the same TCI state pool for both of the UL and DL (joint common TCI state pool) by DCI-based beam management (DCI-level beam indication). M (>1) TCI states may be activated by the MAC CE. UL/DL DCI may select one TCI state from M active TCI states. The selected TCI state may be applied to channels/RSs for both of the UL and DL.

The UE may assume different TCI states (separate TCI states, separate TCI state pools, UL separate TCI state pool and DL separate TCI state pool, separate common TCI state pools, UL common TCI state pool and DL common TCI state pool) for the UL and the DL respectively.

Figure 2:
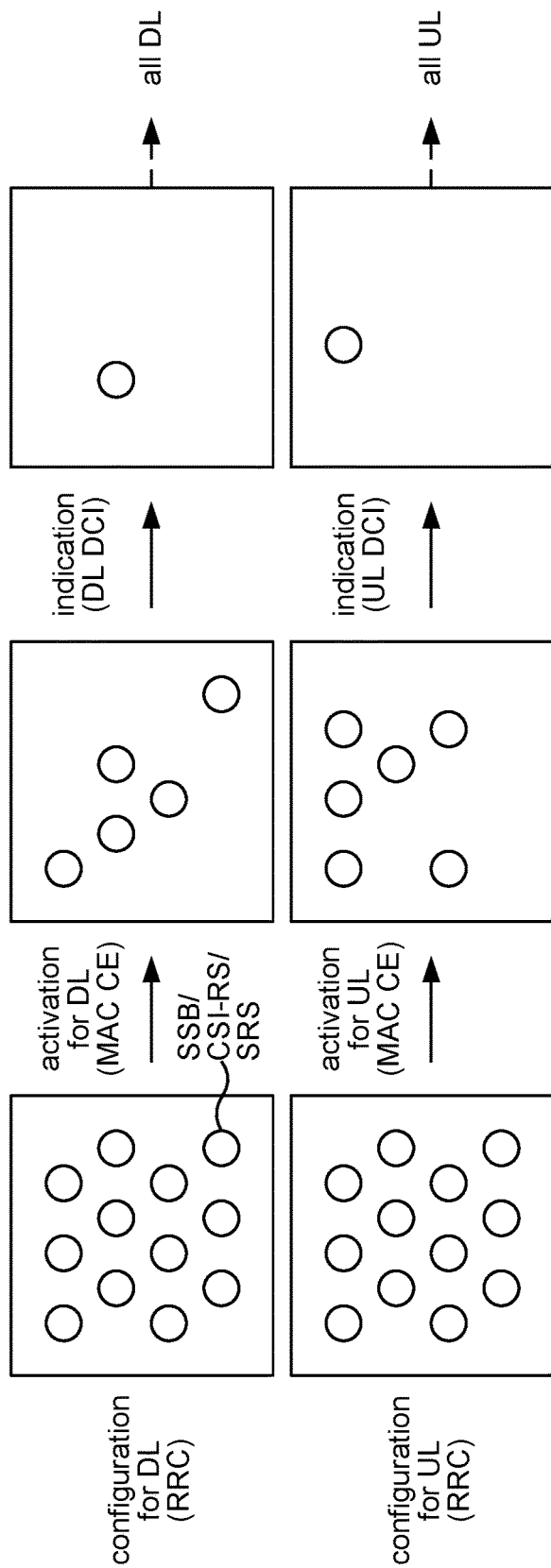
FIG. 2 is a diagram to show an example of a DL common beam and a UL common beam.

In an example of FIG. 2, RRC (parameter, information element) may configure a plurality of TCI states (pools) for each of the UL and DL channels.

A MAC CE may select (activate) one or more (for example, multiple) TCI states (sets) for each of the UL and DL channels. The MAC CE may activate two sets of TCI states.

DL DCI may select (indicate) one or more TCI states (for example, single TCI state). The TCI state(s) may be applied to one or more DL channels. The DL channels may be PDCCHs/PDSCHs/CSI-RSs. The UE may determine a TCI state for each channel/RS of DL by using TCI state operation (TCI framework) in Rel. 16.

UL DCI may select (indicate) one or more TCI states (for example, single TCI state). The TCI state(s) may be applied to one or more UL channels. The UL channels may be PUSCHs/SRSs/PUCCHs.

As use cases for separate common TCI state pools, use case 0, use case 1, and use case 2 below are under study.

[Use Case 0]

The UE uses different UL beams due to maximum permitted exposure (MPE).

Figure 3:
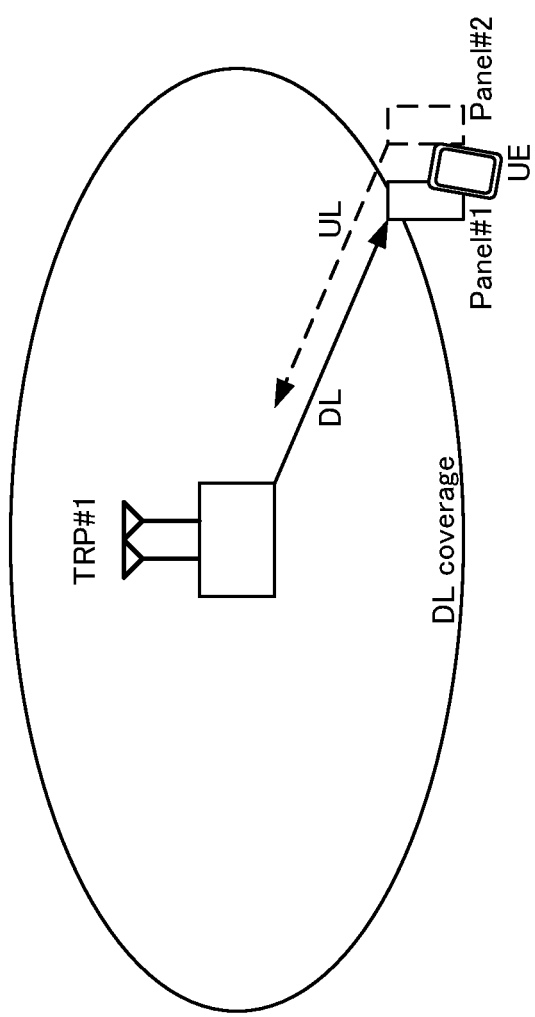
FIG. 3 is a diagram to show an example of use case 0.

In an example of FIG. 3, as a result of MPE issue on UL of panel #1, the UE uses panel #2 for UL.

[Use Case 1]

The UE uses different UL beams due to UL signal strength.

Figure 4:
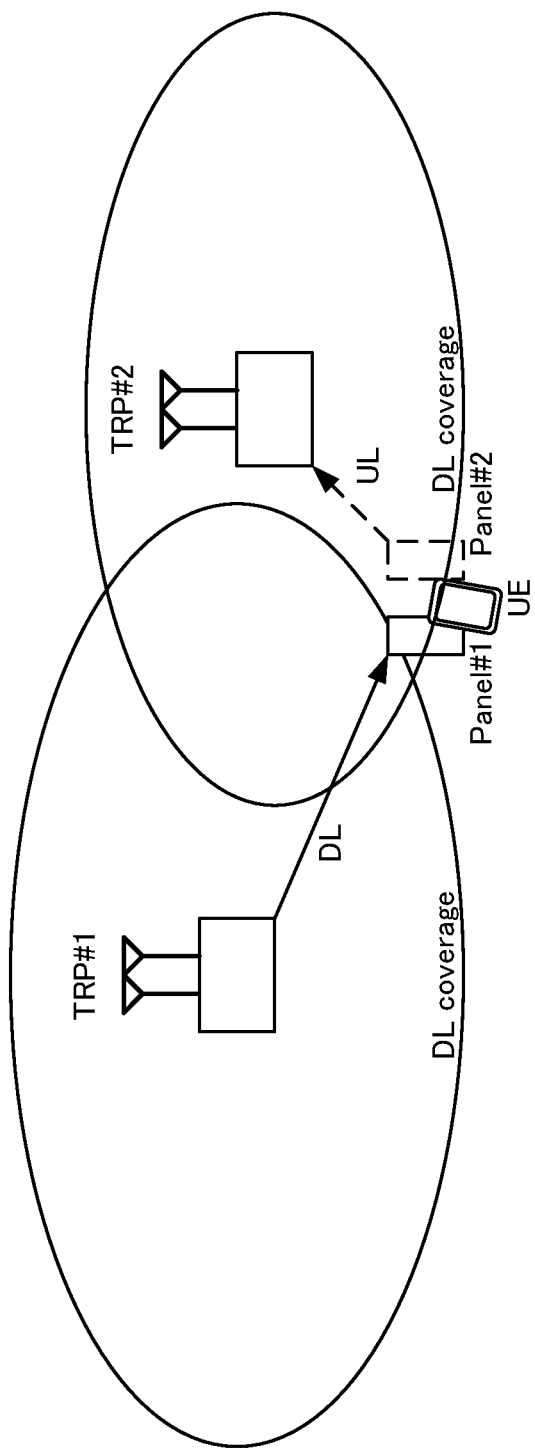
FIG. 4 is a diagram to show an example of use case 1.

In an example of FIG. 4, a distance between the UE and TRP (cell, base station) #1 is longer than a distance between the UE and TRP #2. Here, L1-RSRP of panel #1 is higher than L1-RSRP of panel #2, and UL transmit power of panel #2 is higher than UL transmit power of panel #1. The UE uses panel #1 for DL from TRP #1, and uses panel #2 for UL to TRP #2.

[Use Case 2]

The UE uses different UL beams due to UL load balance.

Figure 5:
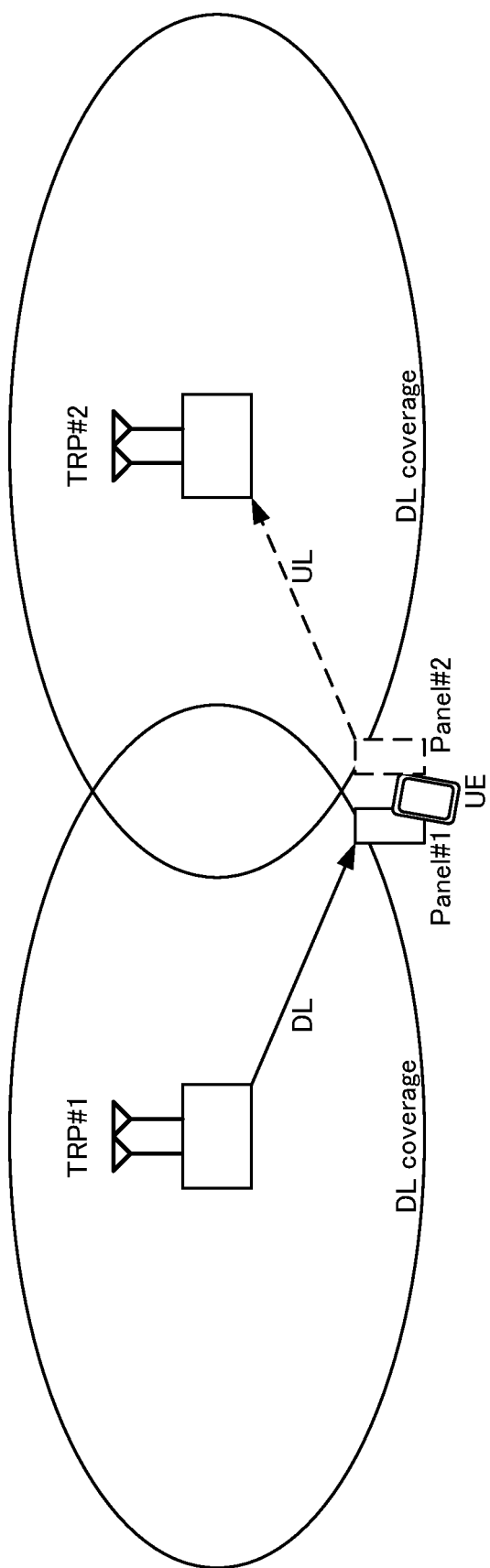
FIG. 5 is a diagram to show an example of use case 2.

In an example of FIG. 5, L1-RSRP of panel #1 is higher than L1-RSRP of panel #2, and UL load of panel #2 is lower than UL load of panel #1. The UE uses panel #1 for DL from TRP #1, and uses panel #2 for UL to TRP #2.

It is conceivable that more scenarios having different requirements are to be studied. For example, in multi-TRP transmission, high-speed train (HST) transmission, inter-cell mobility in a period in which there is a possibility that the UE connects to two cells, and the like, a common beam for respective TRPs or cells may be different.

In this case, the UE may include multiple panels for FR2. In this case, a common beam for respective UE panels may be different.

In the unified TCI framework, the UE may support a joint TCI based on a DL TCI framework in Rel. 15/16. The TCI may include a TCI state including at least one source RS to provide reference (UE assumption) for determination of at least one of QCL and a spatial filter.

A case that the UE uses a joint TCI (joint TCI pool) including reference for both a DL beam and a UL beam and a case that the UE uses one separate TCI (pool) for DL and one separate TCI (pool) for UL are under study.

For the separate TCI pool, a case that a UL TCI state is obtained from the same pool as that for a DL TCI state and a case that a UL TCI state is obtained from a pool different from that for a DL TCI state are under study.

For the separate TCI pools, active TCI pools for each of the UL and DL may be configured/activated by RRC/MAC CE. An active TCI pool common to the UL and DL may be configured/activated by the RRC/MAC CE.

For DCI indication for a common beam (common TCI state), a TCI field in DL DCI may be reused, or a new field (for example, a unified TCI field) in the DL DCI may be used. The DL DCI, PDSCH scheduling DCI, and DCI format 1_1 or 1_2 may be interchangeably interpreted.

For DCI indication for a common beam (common TCI state), a new field (for example, a unified TCI field) in UL DCI may be used. The UL DCI, PUSCH scheduling DCI, and DCI format 0_1 or 0_2 may be interchangeably interpreted.

Figure 6A:
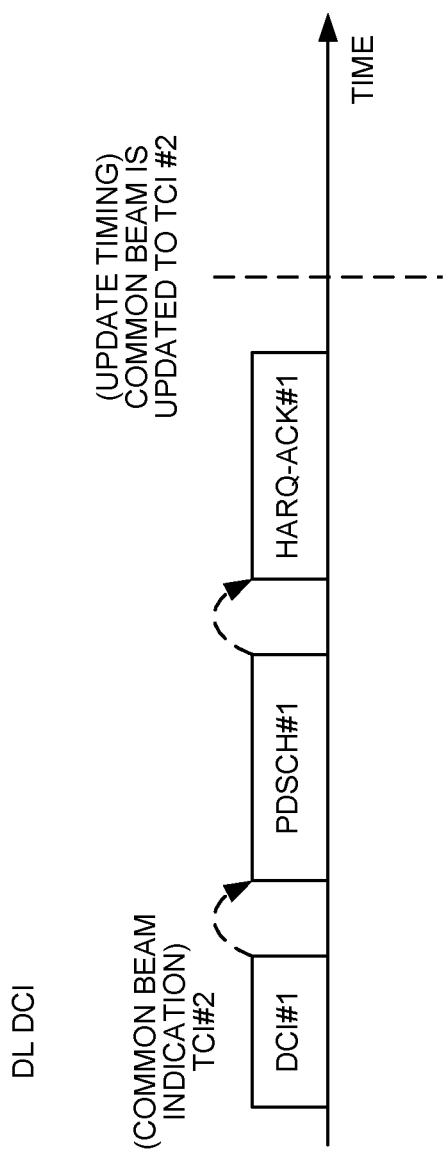
FIGS. 6A and 6B are each a diagram to show an example of an update timing of a common beam.
Figure 6B:
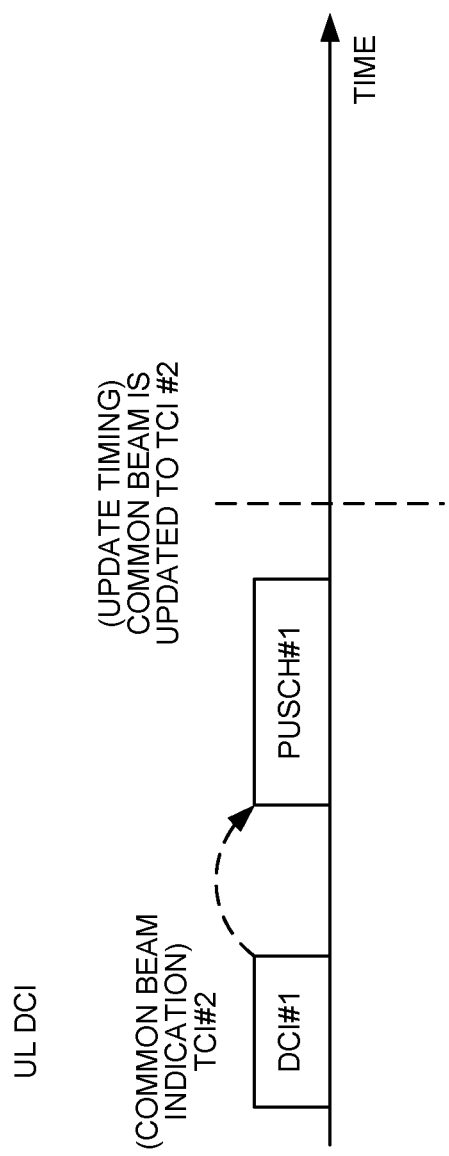

Feedback of DCI indication for a common beam (common TCI state) is under study. If reception of the DCI indication for the common beam has failed, a base station misrecognizes the common beam. Thus, a case that timing of update of the common beam is timing after the UE transmits feedback of the DCI indication is under study. For example, as shown in FIG. 6A, when the DL DCI indicates the common beam (TCI #2), the common beam is updated (to TCI #2) after the UE transmits ACK/NACK (HARQ-ACK information) on a PUCCH/PUSCH. For example, as shown in FIG. 6B, when the UL DCI indicates the common beam (TCI #2), the common beam is updated (to TCI #2) after the UE transmits the PUSCH.

However, the timing of the common beam update has not been fully studied. Unless the timing of the common beam update is definite, a difference in recognition of the common TCI state between the UE and the base station may occur, and degradation in communication quality, degradation in throughput, and the like may occur.

Thus, the inventors of the present invention came up with the idea of a method for updating a TCI state.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, to support, to control, to be able to control, to operate, and to be able to operate may be interchangeably interpreted.

In the present disclosure, configure, activate, update, indicate, enable, specify, and select may be interchangeably interpreted.

In the present disclosure, a MAC CE and an activation/deactivation command may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, a DL-RS having QCL type X, a source of a DL-RS, an SSB, a CSI-RS, and an SRS may be interchangeably interpreted.

UL DCI, DCI to schedule a UL channel (for example, a PUSCH), and DCI format 0_x (x=0, 1, 2, . . . ) may be interchangeably interpreted. DL DCI, DCI to schedule a DL channel (PDSCH), and DCI format 1_x (x=0, 1, 2, . . . ) may be interchangeably interpreted.

In the present disclosure, HARQ-ACK information, ACK, and NACK may be interchangeably interpreted.

In the present disclosure, a link direction, downlink (DL), uplink (UL), and one of UL and DL may be interchangeably interpreted.

In the present disclosure, a pool, a set, a group, and a list may be interchangeably interpreted.

In the present disclosure, a common beam, a common TCI, a common TCI state, a unified TCI, a unified TCI state, a TCI state applicable to DL and UL, a TCI state applied to a plurality (multiple types) of channels/RSs, a TCI state applicable to multiple types of channels/RSs, and a PL-RS may be interchangeably interpreted.

In the present disclosure, a plurality of TCI states configured by RRC, a plurality of TCI states activated by a MAC CE, a pool, a TCI state pool, an active TCI state pool, a common TCI state pool, a joint TCI state pool, a separate TCI state pool, a UL common TCI state pool, a DL common TCI state pool, a common TCI state pool configured/activated by RRC/MAC CE, and TCI state information may be interchangeably interpreted.

(Radio Communication Method)

In the present disclosure, a DL TCI, a DL common TCI, a DL unified TCI, a common TCI, and a unified TCI may be interchangeably interpreted. In the present disclosure, a UL TCI, a UL common TCI, a UL unified TCI, a common TCI, and a unified TCI may be interchangeably interpreted.

In the present disclosure, a case of a joint TCI pool and a case where a joint TCI pool has been configured may be interchangeably interpreted. In the present disclosure, a case of a separate TCI pool and a case where a separate TCI pool has been configured may be interchangeably interpreted.

In the present disclosure, the case where the joint TCI pool has been configured, a case where a TCI pool configured for DL and a TCI pool configured for UL are in common, a case where a TCI pool for both DL and UL has been configured, and a case where one TCI pool (one set of TCIs) has been configured may be interchangeably interpreted.

In the present disclosure, the case where the separate TCI pool has been configured, a case where a TCI pool configured for DL and a TCI pool configured for UL are different from each other, a case where a DL TCI pool (a first TCI pool, a first TCI set) and a UL TCI pool (a second TCI pool, a second TCI set) have been configured, a case where a plurality of TCI pools (a plurality of sets of TCIs) have been configured, and a case where a DL TCI pool has been configured may be interchangeably interpreted. When a DL TCI pool has been configured, a UL TCI pool may be equal to the configured TCI pool.

In the present disclosure, a channel/RS to which the common TCI is applied may be a PDSCH/HARQ-ACK information/PUCCH/PUSCH/CSI-RS/SRS.

First Embodiment

When a common TCI is indicated by DCI, in order to avoid a difference in recognition of a common TCI state between a UE and a base station, the common TCI may be updated after the UE transmits feedback corresponding to the DCI. However, even in a case where the UE transmits the feedback, a difference in recognition of the common TCI state between the UE and the base station occurs when the feedback is misrecognized.

Requirements (upper limits) regarding the probability of misrecognizing ACK as NACK (ACK to NACK error rate)=0.1%, the probability of misrecognizing NACK as ACK (NACK to ACK error rate)=1%, and the probability of misrecognizing non-transmission (discontinuous transmission (DTX)) as ACK (DTX to ACK error rate)=1% are under study. When these requirements are followed, a probability that the UE transmits ACK and the base station judges the ACK as NACK is 0.1% or less.

It is conceivable that a probability that the UE transmits a PUSCH, and the base station fails to receive (does not successfully receive) the PUSCH is higher than the ACK to NACK error rate (about 1 to 10%). When the feedback is transmitted on a PUSCH, the UE transmits the PUSCH, and the base station fails to receive the PUSCH, and this increases the probability of occurrence of a difference in recognition of the common TCI between the UE and the base station.

Thus, timing of update of the common TCI may be timing after a lapse of specific time from an end (a last symbol) of ACK transmission on a PUCCH/PUSCH by the UE. The specific time may be configured by a higher layer, may be defined in specifications, or may be reported by the UE as a UE capability. The specific time may be K symbols.

The UE may follow at least one of aspect 1-1 and aspect 1-2 below.

<<Aspect 1-1>>

A case that the UE does not assume that UL DCI indicates (controls) the common TCI may be defined. A TCI field in DL DCI may indicate (control) the common TCI.

When a joint TCI pool has been configured, the TCI field in the DL DCI may indicate the common TCI.

When a separate TCI pool has been configured, a specific field in the DL DCI may indicate at least one of a UL common TCI and a DL common TCI.

The DL common TCI may be indicated by TCI field #1 in the DL DCI. The UL common TCI may be indicated by TCI field #2 in the DL DCI. When the separate TCI pool has been configured, a field (value) for the UL common TCI and a field (value) for the DL common TCI may exist in the DL DCI.

A common TCI field in the DL DCI may indicate the UL common TCI and the DL common TCI. A size (the number of bits) of the TCI field to indicate the UL common TCI and the DL common TCI may be greater than a size of a TCI field to indicate a DL-only TCI. In this case, flexibility of the common TCI can be enhanced. The size (the number of bits) of the TCI field to indicate the UL common TCI and the DL common TCI may be equal to the size of the TCI field to indicate the DL-only TCI. In this case, DCI overhead can be suppressed.

The field in DCI to indicate the common TCI may follow at least one of field 1 to field 3 below.

[Field 1]

For the joint TCI pool, an existing TCI field in the DL DCI may be used in order to indicate both a DL TCI and a UL TCI.

[Field 2]

For the separate TCI pool, an existing TCI field in the DL DCI may be used in order to indicate a DL TCI.

[Field 3]

For the separate TCI pool, a new field (for example, a unified TCI field) in the DL DCI may be used in order to indicate a UL TCI.

<<Aspect 1-2>>

When a field to indicate the common TCI exists in UL DCI, the UE may transmit, on a PUCCH/PUSCH, ACK for reception of the DCI.

When a joint TCI pool has been configured, the TCI field in the DL DCI may indicate the common TCI. A case that the UE does not assume that the UL DCI indicates (controls) the common TCI may be defined.

In order to avoid an increase in UL resources and DL DCI overhead caused by the UE that transmits ACK for the UL DCI, aspect 1-2 may be employed in only a specific separate TCI pool.

Whether aspect 1-2 is employed in the separate TCI pool may be configured by a higher layer.

When aspect 1-2 is employed in the separate TCI pool, the UE may follow at least one of procedure 1 to procedure 3 below.

[Procedure 1]

A TCI field for indicating a UL common TCI may exist in UL DCI. A field for ACK transmission PUCCH resource indication indicating a PUCCH resource for ACK transmission for the UL DCI may exist. The field for the ACK transmission PUCCH resource indication may be at least one of a PUCCH resource indicator (PRI), an HARQ timing indicator, and a PUCCH TPC command.

[Procedure 2]

A specific field in the UL DCI may indicate the UL common TCI.

[Procedure 3]

When the UE receives UL DCI including the TCI field for indicating the UL common TCI, the UE may transmit ACK by using a PUCCH resource based on the field for the ACK transmission PUCCH resource indication in the UL DCI. When the field for the ACK transmission PUCCH resource indication does not exist in the UL DCI, the UE may determine an ACK transmission PUCCH resource by using a value configured by a higher layer or a value defined in specifications. When the UE fails to receive the UL DCI including the TCI field for indicating the UL common TCI (when the UE misrecognizes the DCI), the UE may not transmit NACK. The UE may transmit only ACK for the UL DCI including the TCI field for indicating the UL common TCI. In Rel. 15, when transmitting the ACK by using PUCCH format 0, the UE determines, based on a higher layer and DCI, two resources (cyclic shifts) corresponding to the ACK and NACK respectively. In procedure 3, the UE may determine only a resource for the ACK based on the higher layer and DCI. In this case, a resource for the NACK can be assigned to another UE, and thus efficiency in resource usage can be improved.

There is a possibility that an error rate of a case where the ACK is transmitted on a PUSCH is higher than an error rate of a case where the ACK is transmitted on a PUCCH, and thus a first embodiment may be limited to the case where the ACK is transmitted on the PUCCH.

Figure 7:
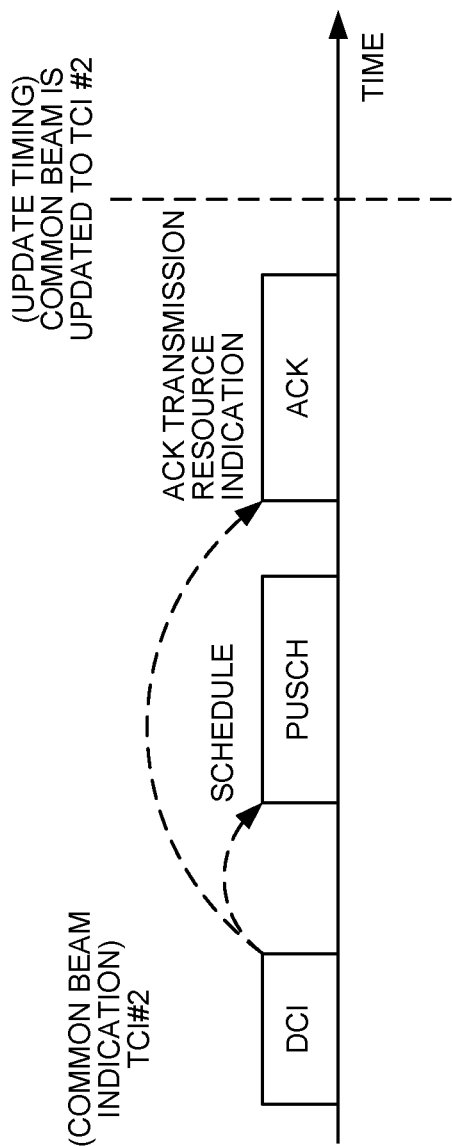
FIG. 7 is a diagram to show an example of aspect 1-2.

In an example of FIG. 7, the UE receives DCI. The DCI schedules a PUSCH, indicates TCI #2 as a common TCI, and indicates an ACK transmission resource (ACK transmission PUCCH resource). The UE transmits the scheduled PUSCH, and transmits ACK for the DCI. The common TCI is updated to TCI #2 after a lapse of specific time from an end of the ACK transmission.

A transmit beam applied to the ACK for the DCI may follow one of beam 1 to beam 5 below.

[Beam 1] A previous common TCI. A common TCI applied right before the common TCI indicated by the DCI.
[Beam 2] A TCI indicated by the DCI.
[Beam 3] A common TCI after update. The common TCI indicated by the DCI.
[Beam 4] A TCI applied to the DCI.
[Beam 5] A TCI used for a transmit beam for the PUSCH.

The field in DCI to indicate the common TCI may follow at least one of field 1 to field 4 below.
[Field 1]
For the joint TCI pool, an existing TCI field in the DL DCI may be used in order to indicate both a DL TCI and a UL TCI.
[Field 2]
For the joint TCI pool, a new field (for example, a unified TCI field) in the UL DCI may be used in order to indicate both a DL TCI and a UL TCI.
[Field 3]
For the separate TCI pool, an existing TCI field in the DL DCI may be used in order to indicate a DL TCI.
[Field 4]
For the separate TCI pool, a new field (for example, a unified TCI field) in the UL DCI may be used in order to indicate a UL TCI.

According to a first embodiment described above, a difference in recognition of a common TCI between a UE and a base station can be avoided.

Second Embodiment

UL DCI may indicate (control) a common TCI. When the UL DCI indicates the common TCI, timing of update of the common TCI may be timing after a lapse of specific time from an end (a last symbol) of a signal corresponding to ACK for a PUSCH. The specific time may be configured by a higher layer, may be defined in specifications, or may be reported by a UE as a UE capability.

The signal corresponding to the ACK for the PUSCH may be DCI. The signal corresponding to the ACK for the PUSCH may be DCI having a field value based on a field value in UL DCI to schedule the PUSCH. The DCI may be similar to ACK for a PUSCH to carry a MAC CE in SCell BFR. The end of the signal corresponding to the ACK for the PUSCH may be a last symbol of PDCCH reception with a DCI format to schedule PUSCH transmission having the same HARQ process number as an HARQ process number for transmission of a first PUSCH, the DCI format having a toggled NDI field value.

Figure 8:
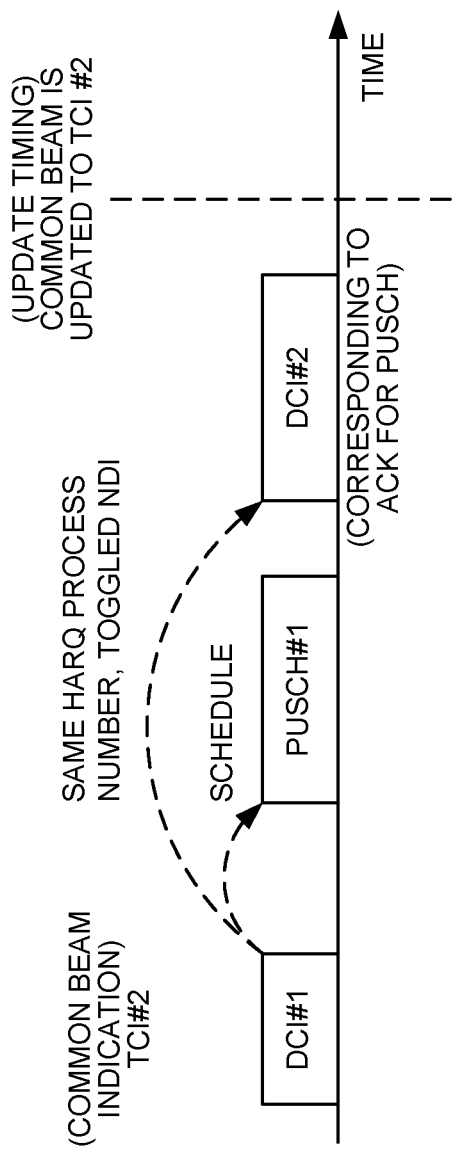
FIG. 8 is a diagram to show an example of a second embodiment.

In an example of FIG. 8, the UE receives DCI #1. This DCI #1 schedules PUSCH #1, and indicates TCI #2 as a common TCI. Subsequently, the UE receives, as a signal corresponding to ACK for PUSCH #1, DCI #2 having the same HARQ process number as that of PUSCH #1 (HARQ process number indicated by DCI #1) and having a toggled NDI field value (based on an NDI field value indicated by DCI #1). The common TCI is updated to TCI #2 after the reception of DCI #2.

When a joint TCI pool has been configured, a TCI field in DL DCI may indicate the common TCI. A case that the UE does not assume that the UL DCI indicates the common TCI may be defined. In a case where the UL DCI indicates the common TCI, it takes time (several slots) to transmit DCI corresponding to the ACK for the PUSCH, and thus there is a possibility that a case where the DL DCI indicates the common TCI can further suppress delay compared to the case of the UL DCI.

Whether a second embodiment is employed in a separate TCI pool may be configured by a higher layer. When the employment of the second embodiment is configured, a TCI field may exist in the UL DCI, and a UL common TCI may be indicated by the TCI field in the UL DCI.

When the separate TCI pool has been configured, the TCI field may exist in the DL DCI, or the TCI field may exist in the UL DCI. A DL common TCI may be indicated by the TCI field in the DL DCI. A UL common TCI may be indicated by the TCI field in the UL DCI.

A transmit beam applied to the signal corresponding to the ACK for the PUSCH may follow one of beam 1 to beam 5 below.

[Beam 1] A previous common TCI. A common TCI applied right before the common TCI indicated by the DCI.
[Beam 2] A TCI indicated by the DCI.
[Beam 3] A common TCI after update. The common TCI indicated by the DCI.
[Beam 4] A TCI applied to the DCI.
[Beam 5] A TCI used for a transmit beam for the PUSCH.

The field in DCI to indicate the common TCI may follow at least one of field 1 to field 4 below.
[Field 1]
For the joint TCI pool, an existing TCI field in the DL DCI may be used in order to indicate both a DL TCI and a UL TCI.
[Field 2]
For the joint TCI pool, a new field (for example, a unified TCI field) in the UL DCI may be used in order to indicate both a DL TCI and a UL TCI.
[Field 3]
For the separate TCI pool, an existing TCI field in the DL DCI may be used in order to indicate a DL TCI.
[Field 4]
For the separate TCI pool, a new field (for example, a unified TCI field) in the UL DCI may be used in order to indicate a UL TCI.

According to a second embodiment described above, a difference in recognition of a common TCI between a UE and a base station can be avoided.

Third Embodiment

Scheduling DCI may control a TCI state for at least one of a PDSCH/PUSCH scheduled by the scheduling DCI and HARQ-ACK information corresponding to the PDSCH/PUSCH.

The scheduling DCI may follow any one of aspect 3-1 and aspect 3-2 below.

<<Aspect 3-1>>

A new field in the scheduling DCI may indicate (control) at least one of a common TCI and a TCI for the scheduled PDSCH/PUSCH and corresponding HARQ-ACK information. The new field may be, for example, a unified TCI field.

If scheduling DCI for a PDSCH/PUSCH indicates the common TCI, a TCI indicated by the scheduling DCI may be applied to at least one of a PDSCH/PUSCH scheduled by the scheduling DCI and HARQ-ACK information transmission corresponding to the PDSCH/PUSCH. If scheduling DCI for a PDSCH/PUSCH indicates the common TCI, a TCI before update (applied before the common TCI indicated by the DCI) may not be applied to a PDSCH/PUSCH scheduled by the scheduling DCI and HARQ-ACK information transmission corresponding to the PDSCH/PUSCH.

Figure 9A:
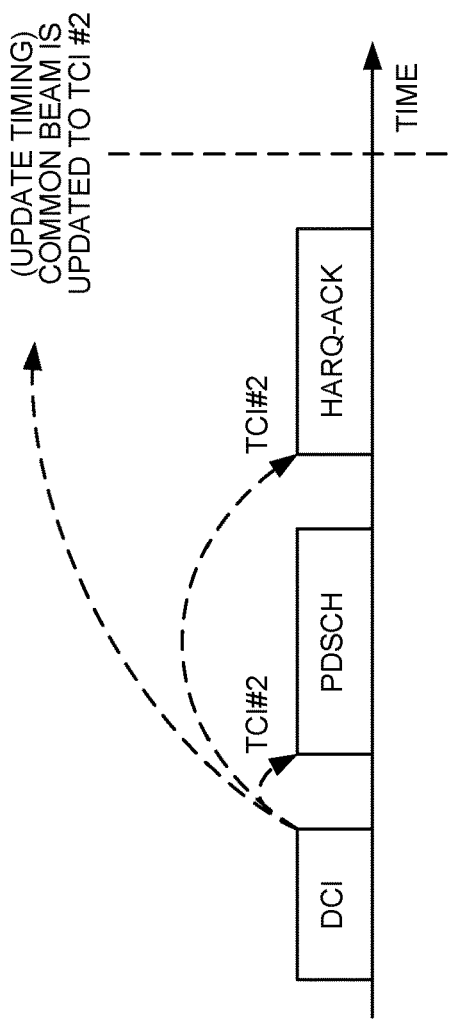
FIGS. 9A and 9B are each a diagram to show an example of aspect 3-1.

In an example of FIG. 9A, a unified TCI field in DL DCI indicates TCI #2 as both of the common TCI and the TCI for the scheduled PDSCH and corresponding HARQ-ACK information. After the HARQ-ACK information transmission, the common TCI may be updated to TCI #2.

Figure 9B:
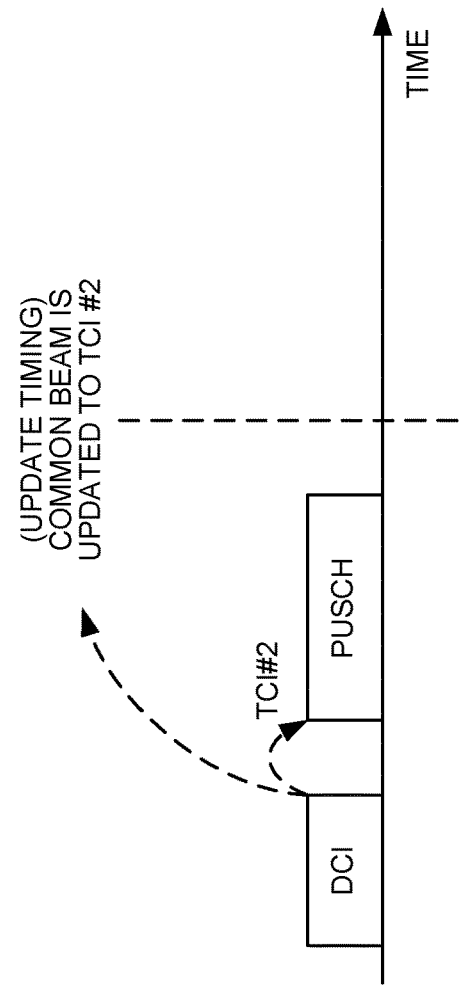

In an example of FIG. 9B, a unified TCI field in UL DCI indicates TCI #2 as both of the common TCI and the scheduled PUSCH. After transmission of the PUSCH, the common TCI may be updated to TCI #2.

In order to avoid a difference in recognition of the common TCI between a UE and a base station, the common TCI may be updated after the UE transmits feedback on DCI indication. For the DL DCI, the feedback may be HARQ-ACK transmission for the PDSCH. Scheduling DCI for a PDSCH may indicate the common TCI.

If scheduling DCI for a PDSCH indicates the common TCI, the TCI indicated by the scheduling DCI may be applied to a PDSCH scheduled by the scheduling DCI and HARQ-ACK transmission associated with the PDSCH. If scheduling DCI for a PDSCH indicates the common TCI, the common TCI before the update may not be applied to a PDSCH scheduled by the DCI and HARQ-ACK transmission associated with the PDSCH.

In order to avoid a difference in recognition of the common TCI between the UE and the base station, the common TCI may be updated after the UE transmits feedback on DCI indication. For the DL DCI, the feedback may be HARQ-ACK transmission for the PDSCH. Scheduling DCI for a PDSCH may indicate the common TCI. For the UL DCI, the feedback may be PUSCH transmission. Scheduling DCI for a PUSCH may indicate the common TCI.

If scheduling DCI for a PDSCH/PUSCH indicates the common TCI, the TCI indicated by the scheduling DCI may be applied to at least one of a PDSCH/PUSCH scheduled by the scheduling DCI and HARQ-ACK transmission associated with the PDSCH/PUSCH. If scheduling DCI for a PDSCH/PUSCH indicates the common TCI, the common TCI before the update may not be applied to a PDSCH/PUSCH scheduled by the DCI and HARQ-ACK transmission associated with the PDSCH/PUSCH.

<<Aspect 3-2>>

A new field in scheduling DCI may indicate (control) the common TCI. The new field may be, for example, a unified TCI field.

If scheduling DCI for a PDSCH/PUSCH indicates the common TCI, a TCI indicated by the scheduling DCI may be applied to at least one of a PDSCH/PUSCH scheduled by the scheduling DCI and HARQ-ACK information transmission corresponding to the PDSCH/PUSCH. If scheduling DCI for a PDSCH/PUSCH indicates the common TCI, a TCI before update (applied before the common TCI indicated by the DCI) may not be applied to a PDSCH/PUSCH scheduled by the scheduling DCI and HARQ-ACK information transmission corresponding to the PDSCH/PUSCH.

Figure 10A:
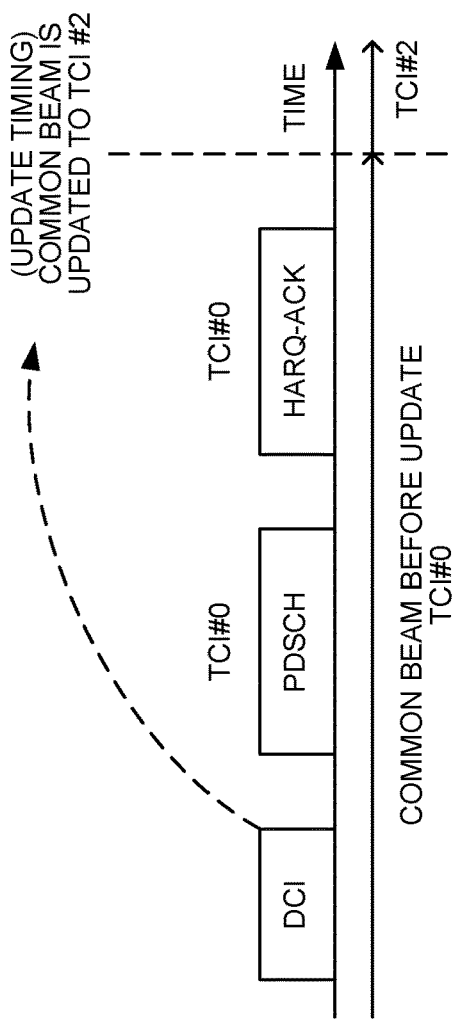
FIGS. 10A and 10B are each a diagram to show an example of aspect 3-2.

In an example of FIG. 10A, a unified TCI field in DL DCI indicates TCI #2 as the common TCI. The common TCI before update is TCI #0. The common TCI before the update may be applied to the DL DCI, a PDSCH scheduled by the DL DCI, and HARQ-ACK information transmission corresponding to the PDSCH. After the HARQ-ACK information transmission, the common TCI may be updated to TCI #2.

Figure 10B:
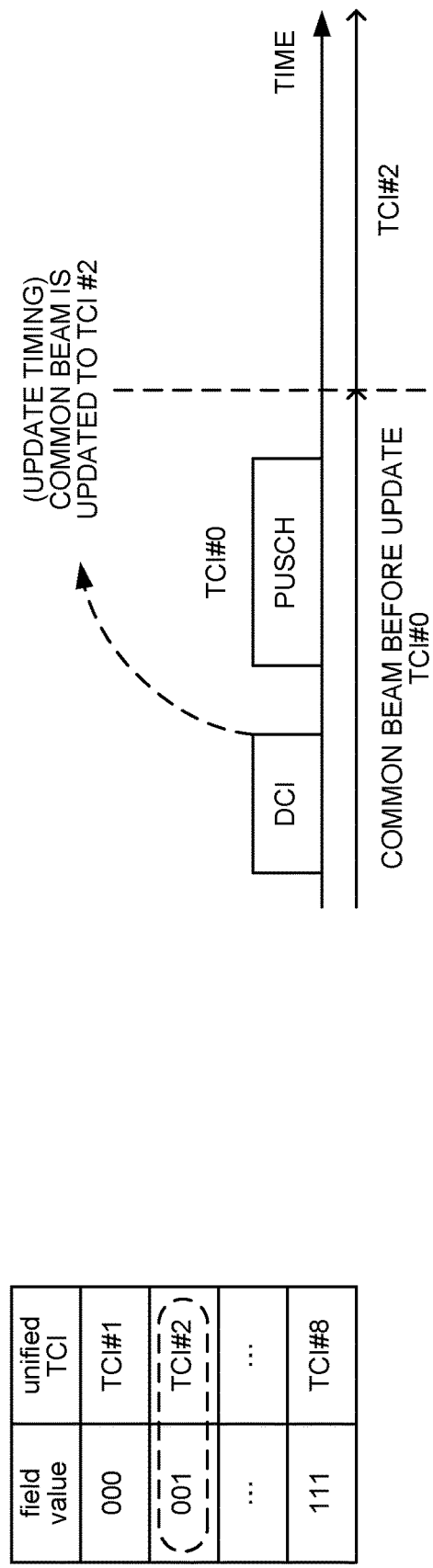

In an example of FIG. 10B, a unified TCI field in UL DCI indicates TCI #2 as the common TCI. The common TCI before update is TCI #0. The common TCI before the update may be applied to the UL DCI and a PUSCH scheduled by the UL DCI. After transmission of the PUSCH, the common TCI may be updated to TCI #2.

<<Target of Employment of Aspect 3-1>>

In aspect 3-1, the TCI indicated by the scheduling DCI may be applied to only at least one of the PDSCH, the PUSCH, and the HARQ-ACK information.

For example, the TCI indicated by the scheduling DCI may be applied to a PDSCH scheduled by the scheduling DCI. For example, the TCI indicated by the scheduling DCI may be applied to a PDSCH/PUSCH scheduled by the scheduling DCI. In Rel. 16, a mechanism for controlling a UL beam for HARQ-ACK information transmission by using DCI is absent.

Which channel the TCI (common TCI) indicated by the scheduling DCI is applied to may be defined by specifications, or may be configured by a higher layer. For example, whether the common TCI is applied may be configured by the higher layer for each channel/for each resource. The common TCI (TCI indicated by the scheduling DCI) of aspect 3-1 may be applied for each channel/for each resource for which the application of the common TCI has been configured.

Whether a TCI indicated by common DCI is applied may follow at least one of configuration method 1 to configuration method 3 below.

[Configuration Method 1]

Whether the common TCI is applied is configured by the higher layer for each resource. The common TCI (TCI indicated by the scheduling DCI) of aspect 3-1 may be applied to a transmit/receive beam for a resource for which the application of the common TCI has been configured.

[Configuration Method 2]

Whether the common TCI is applied is configured by the higher layer for each channel. The common TCI (TCI indicated by the scheduling DCI) of aspect 3-1 may be applied to a transmit/receive beam for a channel for which the application of the common TCI has been configured. The common TCI (TCI indicated by the scheduling DCI) of aspect 3-1 may be applied to a transmit/receive beam for a resource for which the application of the common TCI has been configured. For example, the common TCI (TCI indicated by the scheduling DCI) of aspect 3-1 may be applied to a resource for which a TCI state/spatial relation in Rel. 16 is not configured.

[Configuration Method 3]

Whether the common TCI is applied may be configured by the higher layer for each group of a plurality of channels (or all channels), or may be configured for each BWP/for each cell/for each UE. A transmit/receive beam for a channel for which the application of the common TCI has been configured may be the common TCI (TCI indicated by the scheduling DCI) of aspect 3-1. For example, the common TCI (TCI indicated by the scheduling DCI) of aspect 3-1 may be applied to a resource for which a TCI state/spatial relation in Rel. 16 is not configured.

<<Variations of Aspect 3-1>>

The DL DCI may indicate a TCI for at least one of a PDSCH scheduled by the DL DCI and HARQ-ACK information corresponding to the PDSCH, and a common TCI.

The UL DCI may indicate a TCI for at least one of a PUSCH scheduled by the UL DCI and HARQ-ACK information corresponding to the PUSCH (the signal corresponding to the ACK for the PUSCH of the second embodiment), and a common TCI.

The scheduling DCI may follow any one of DCI 1 and DCI 2 below.

[DCI 1]

A first field (for example, a scheduled TCI field) in the DL DCI may indicate a TCI for at least one of a PDSCH scheduled by the DL TCI and HARQ-ACK information corresponding to the PDSCH. A second field (for example, a unified TCI field) in the DL DCI may indicate a common TCI.

A first field (for example, a scheduled TCI field) in the UL DCI may indicate a TCI for at least one of a PUSCH scheduled by the UL TCI and HARQ-ACK information corresponding to the PUSCH. A second field (for example, a unified TCI field) in the UL DCI may indicate a common TCI.

Figure 11A:
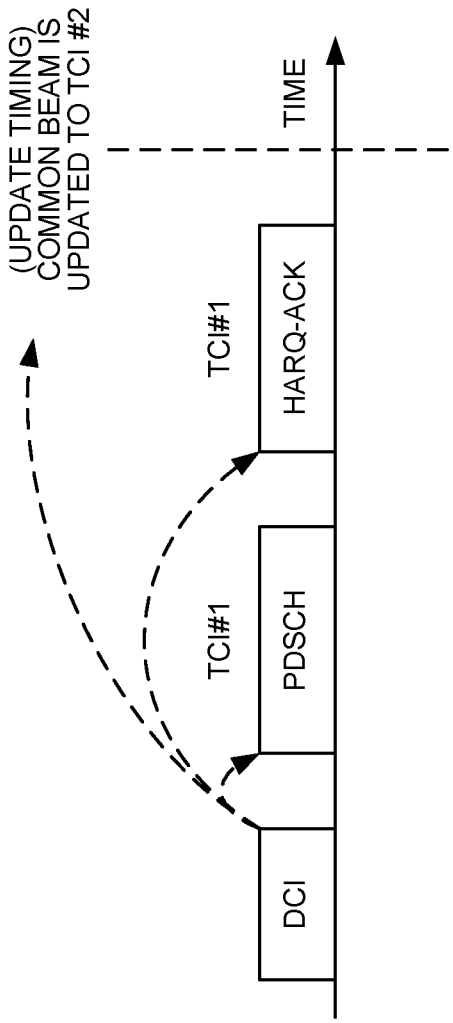
FIGS. 11A and 11B are each a diagram to show an example of variations of aspect 3-1.

In an example of FIG. 11A, the scheduled TCI field in the DL DCI indicates TCI #1 as a TCI for a PDSCH scheduled by the DL DCI and HARQ-ACK information transmission corresponding to the PDSCH. The unified TCI field in the DL DCI indicates TCI #2 as the common TCI. After the HARQ-ACK information transmission, the common TCI may be updated to TCI #2.

Figure 11B:
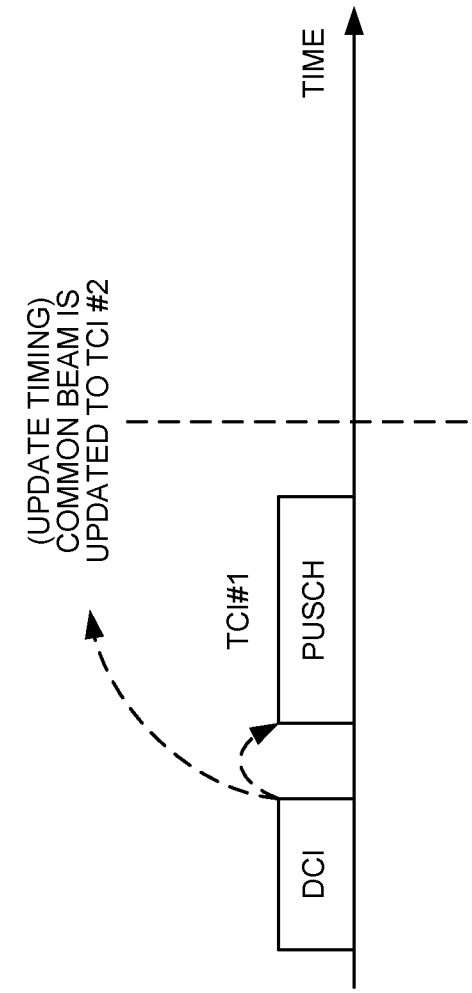

In an example of FIG. 11B, the scheduled TCI field in the UL DCI indicates TCI #1 as a TCI for a PUSCH scheduled by the UL DCI. The unified TCI field in the UL DCI indicates TCI #2 as the common TCI. After transmission of the PUSCH, the common TCI may be updated to TCI #2.

[DCI 2]

One field (for example, TCI field or unified TCI field) in the DL DCI may indicate a TCI for at least one of a PDSCH scheduled by the DL TCI and HARQ-ACK information corresponding to the PDSCH, and a common TCI.

One field (for example, TCI field or unified TCI field) in the UL DCI may indicate a TCI for at least one of a PUSCH scheduled by the UL TCI and HARQ-ACK information corresponding to the PUSCH, and a common TCI.

Figure 12A:
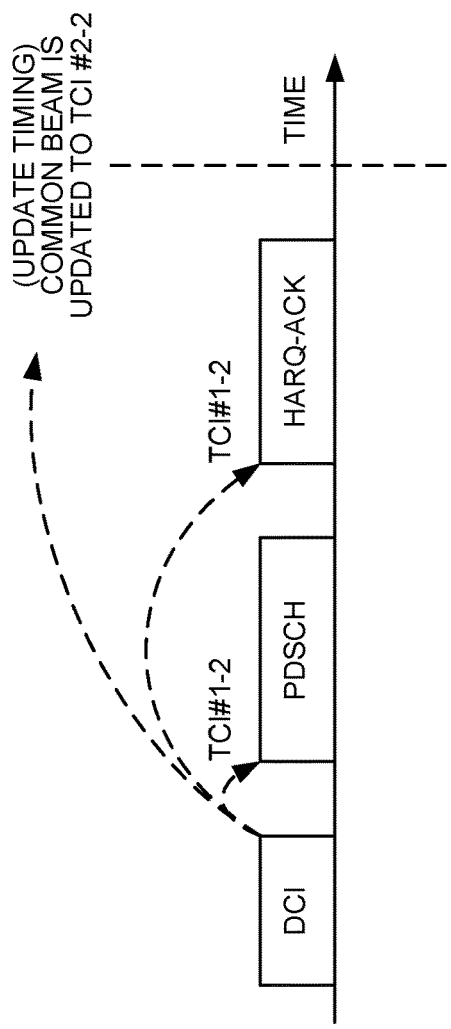
FIGS. 12A and 12B are each a diagram to show another example of the variations of aspect 3-1.

In an example of FIG. 12A, value 001 of the TCI field in the DL DCI is associated with TCI #1-2 as a TCI (scheduled TCI) for a PDSCH scheduled by the DL DCI and HARQ-ACK information transmission corresponding to the PDSCH, and is associated with TCI #2-2 as a common TCI (unified TCI). TCI #1-2 may be applied to the PDSCH based on the DL DCI, and the HARQ-ACK information transmission. The common TCI may be updated to TCI #2-2 after a lapse of specific time from an end of the HARQ-ACK information transmission.

Figure 12B:
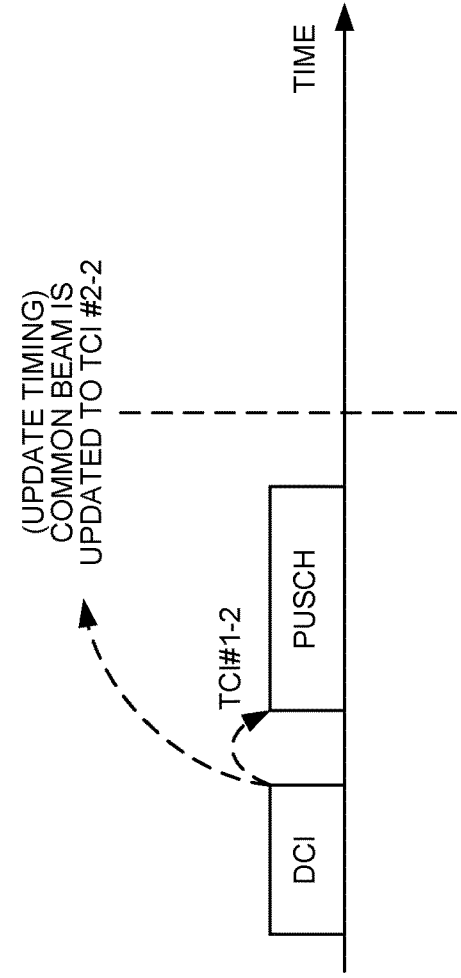

In an example of FIG. 12B, value 001 of the TCI field in the UL DCI is associated with TCI #1-2 as a TCI (scheduled TCI) for a PUSCH scheduled by the UL DCI, and is associated with TCI #2-2 as a common TCI (unified TCI). TCI #1-2 may be applied to the PUSCH based on the UL DCI. The common TCI may be updated to TCI #2-2 after a lapse of specific time from an end of transmission of the PUSCH.

According to a third embodiment described above, a difference in recognition of a common TCI between a UE and a base station can be avoided.

Fourth Embodiment

When time offset (scheduling offset) between DCI and a PDSCH scheduled by the DCI is less than a threshold value, a TCI for the scheduled PDSCH may be any one of TCI 1 and TCI 2 below.

[TCI 1] A default TCI state for the PDSCH.

[TCI 2] A common TCI before update (before a common TCI indicated by the DCI is applied).

There is a case where a UE receives a signal for the PDSCH before decoding of the DCI. In this case, the UE buffers a receive signal by using a specific receive beam (TCI state). On the other hand, the UE transmits a PUSCH/HARQ-ACK information after the decoding of the DCI. Thus, TCI 1 or TCI 2 is applied to only the PDSCH.

Figure 13:
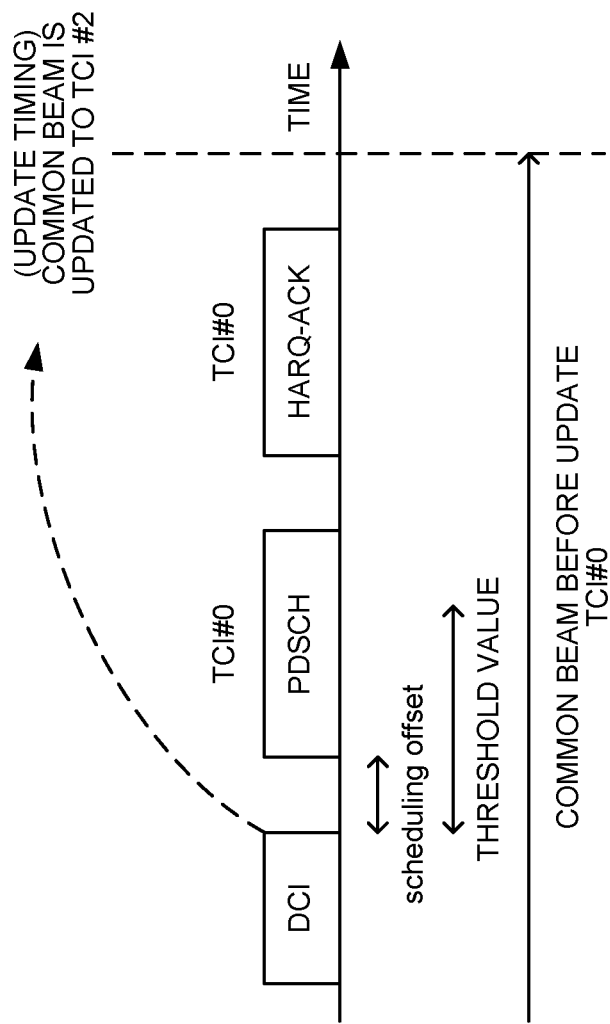
FIG. 13 is a diagram to show an example of a fourth embodiment.

In an example of FIG. 13, DL DCI indicates TCI #2 as both a TCI for a PDSCH scheduled by the DL DCI and HARQ-ACK information transmission corresponding to the PDSCH, and a common TCI (unified TCI). When the scheduling offset is less than the threshold value (for example, timeDurationForQCL), and a default TCI for the PDSCH is TCI #2, TCI #2 is applied to the PDSCH and the HARQ-ACK information. After the HARQ-ACK information transmission, the common DCI may be updated to TCI #2.

According to a fourth embodiment described above, a difference in recognition of a common TCI between a UE and a base station can be avoided even when scheduling offset is less than a threshold value.

Other Embodiments

A UE capability corresponding to at least one function (characteristic, feature) in the first to fourth embodiments may be defined. When a UE has reported this UE capability, the UE may perform a corresponding function. When the UE has reported this UE capability, and a higher layer parameter corresponding to this function has been configured, the UE may perform a corresponding function. The higher layer parameter (RRC information element) corresponding to this function may be defined. When this higher layer parameter has been configured, the UE may perform a corresponding function.

The UE capability may indicate whether the UE supports this function.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 14:
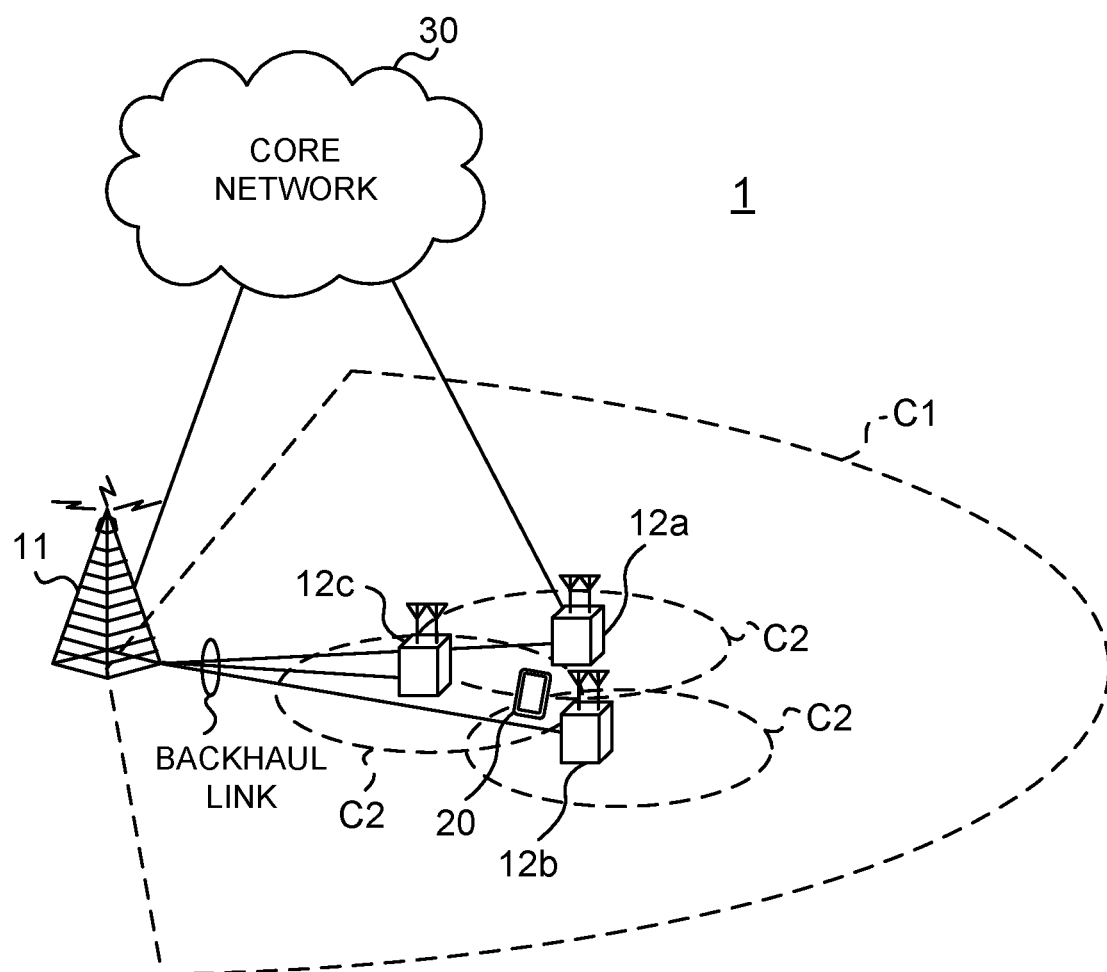
FIG. 14 is a diagram to show an example of a schematic structure of a radio communication system according to one embodiment.

FIG. 14 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are transmitted on the PDSCH. User data, higher layer control information and so on may be transmitted on the PUSCH. The Master Information Blocks (MIBs) may be transmitted on the PBCH.

Lower layer control information may be transmitted on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be transmitted by means of the PUCCH. By means of the PRACH, random access preambles for establishing connections with cells may be transmitted.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be transmitted. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be transmitted as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be transmitted as an uplink reference signal (UL-RS). Note that DMRS may be referred to as a "user terminal specific reference signal (UE-specific Reference Signal)."

(Base Station)

Figure 15:
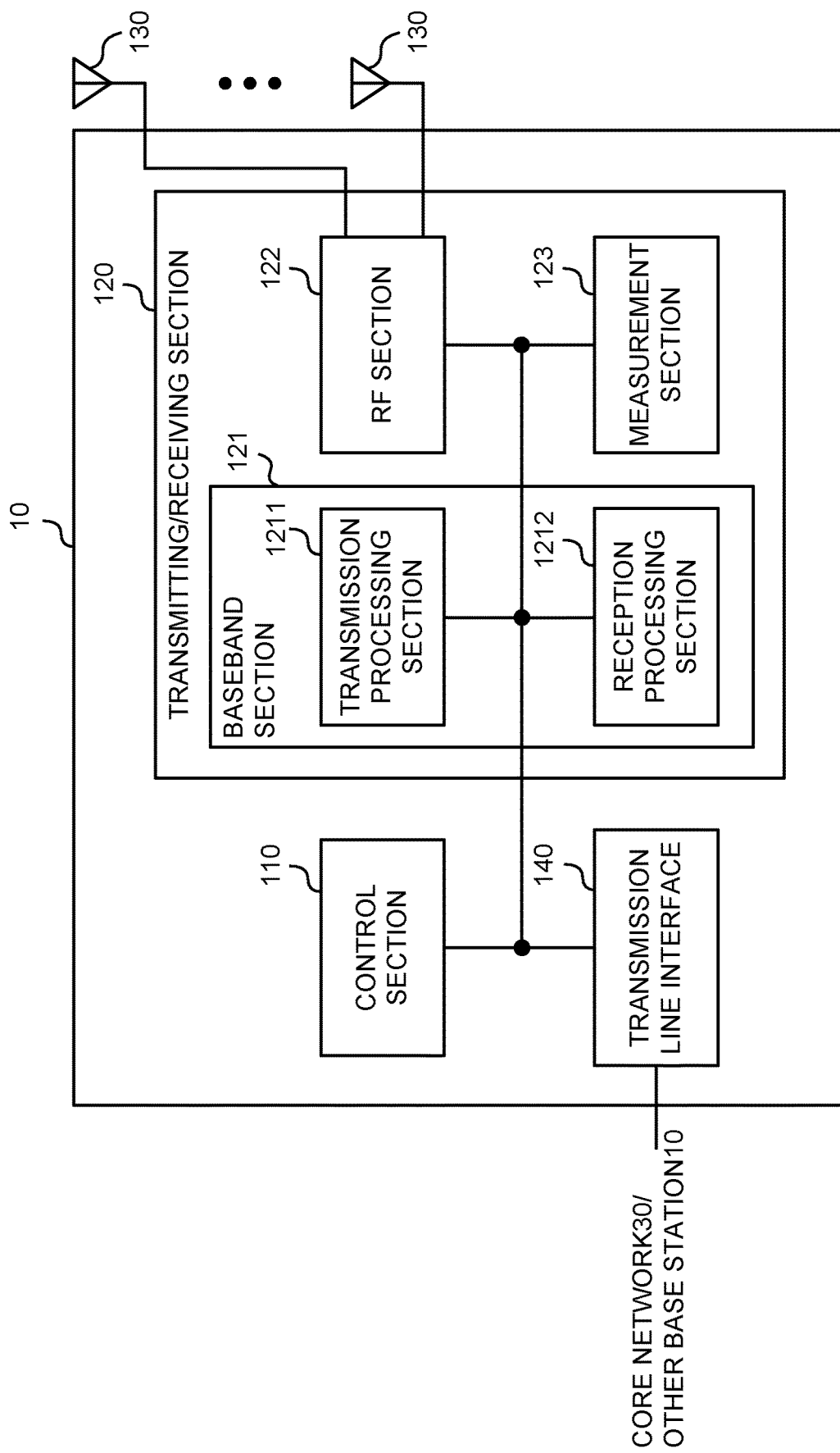
FIG. 15 is a diagram to show an example of a structure of a base station according to one embodiment.

FIG. 15 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

The transmitting/receiving section 120 may transmit first downlink control information indicating a transmission configuration indication (TCI) state applicable to multiple types of channels. The control section 110 may apply the TCI state to the multiple types of channels after timing at which specific time passes from an end of operation for any one of reception of an uplink channel based on the first downlink control information and transmission of second downlink control information after the first downlink control information.

The transmitting/receiving section 120 may transmit downlink control information, the downlink control information being configured to schedule a shared channel and indicate a transmission configuration indication (TCI) state applicable to multiple types of channels. The control section 110 may apply the TCI state to the multiple types of channels.

(User Terminal)

Figure 16:
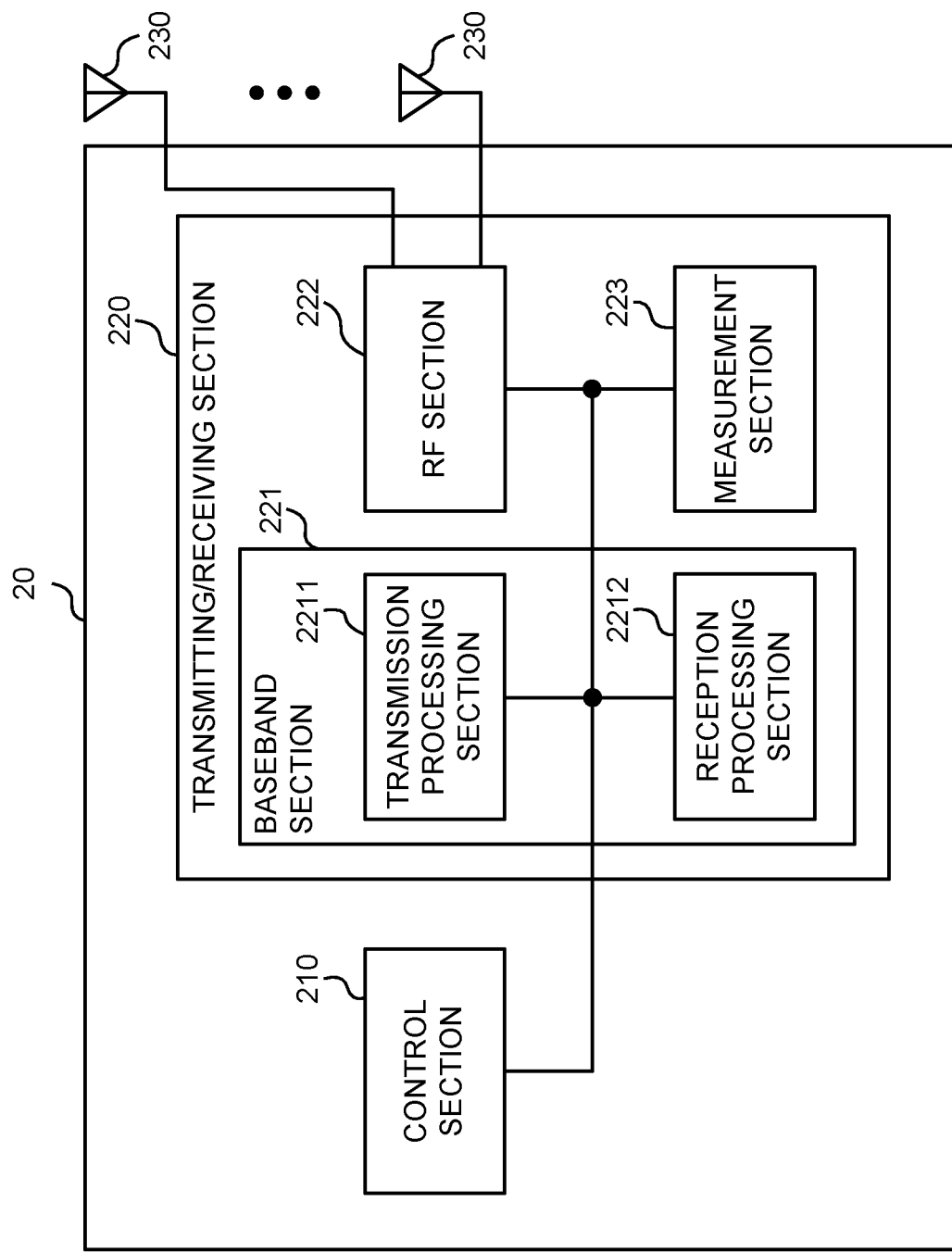
FIG. 16 is a diagram to show an example of a structure of a user terminal according to one embodiment.

FIG. 16 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

The transmitting/receiving section 220 may receive first downlink control information indicating a transmission configuration indication (TCI) state (for example, a common TCI) applicable to multiple types of channels. The control section 210 may apply the TCI state to the multiple types of channels after timing at which specific time passes from an end of operation for any one of transmission of an uplink channel (for example, a PUCCH/PUSCH) based on the first downlink control information and reception of second downlink control information after the first downlink control information (the first embodiment, the second embodiment).

The first downlink control information may schedule a physical downlink shared channel. The operation may be the transmission of the uplink channel (aspect 1-1).

The first downlink control information may schedule a physical uplink shared channel. The operation may be the transmission of the uplink channel (aspect 1-2).

The first downlink control information may schedule a physical uplink shared channel. The operation may be the reception of the second downlink control information. A field value in the second downlink control information may be based on a field value in the first downlink control information (the second embodiment).

Downlink control information may schedule a shared channel, and may indicate a transmission configuration indication (TCI) state applicable to multiple types of channels. The transmitting/receiving section 220 may receive the downlink control information. The control section 210 may apply the TCI state to the multiple types of channels (the third embodiment, the fourth embodiment).

The control section 210 may apply the TCI state to at least one of the shared channel and an uplink channel based on the downlink control information (aspect 3-1).

The control section 210 may apply the TCI state to the multiple types of channels after timing at which specific time passes from an end of transmission of an uplink channel based on the downlink control information (aspect 3-2).

The shared channel may be a physical downlink shared channel. When time offset between the downlink control information and the physical downlink shared channel is less than a threshold value, the control section 210 may apply, to the physical downlink shared channel, any one of a default TCI state for the physical downlink shared channel and a second TCI state applied to the multiple types of channels before the TCI state is applied (the fourth embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 17:
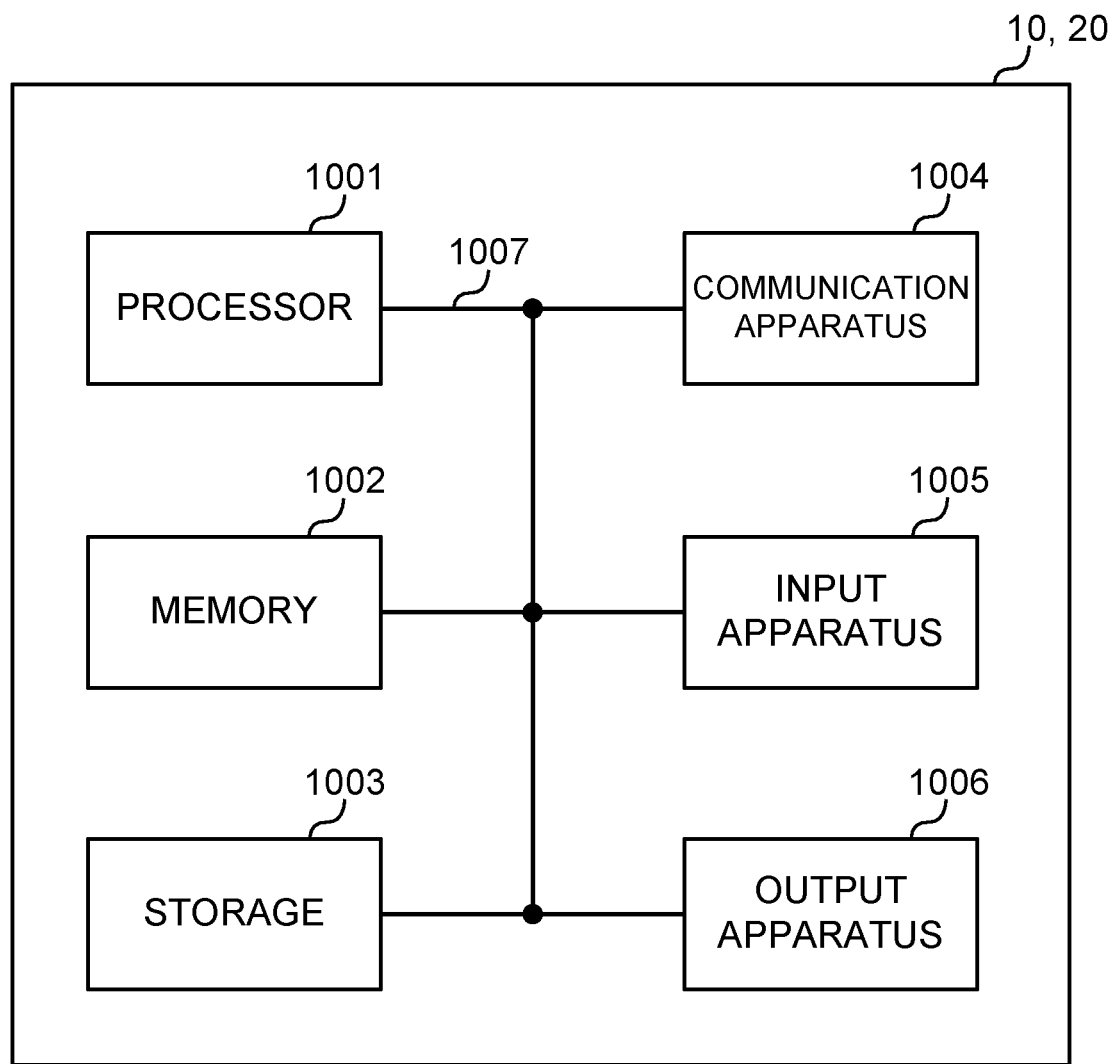
FIG. 17 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 17 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a receiver that receives downlink control information (DCI) including a transmission configuration indication (TCI) field indicating a TCI state applicable to multiple types of channels or signals for uplink (UL) and downlink (DL); and
a processor that applies the TCI state to the multiple types of channels or signals after a lapse of specific time from a transmission of HARQ-ACK information transmitting only ACK for the DCI including the TCI field indicating the TCI state,
wherein a number of bits of the TCI field when the TCI field indicates TCI states of both the UL and the DL is equal to a number of bits of the TCI field when the TCI field indicates a TCI state of only the DL.

2. The terminal according to claim 1, wherein the DCI is a DCI that schedules downlink and is not a DCI that schedules uplink.

3. The terminal according to claim 1, wherein the channels or signals for the UL include PUSCH, SRS, and PUCCH, and the channels or signals for the DL include PDCCH, PDSCH, and CSI-RS.

4. A radio communication method for a terminal comprising:
receiving downlink control information (DCI) including a transmission configuration indication (TCI) field indicating a TCI state applicable to multiple types of channels or signals for uplink (UL) and downlink (DL); and
applying the TCI state to the multiple types of channels or signals after a lapse of specific time from a transmission of HARQ-ACK information transmitting only ACK for the DCI including the TCI field indicating the TCI state, wherein a number of bits of the TCI field when the TCI field indicates TCI states of both the UL and the DL is equal to a number of bits of the TCI field when the TCI field indicates a TCI state of only the DL.

5. A base station comprising:

a transmitter that transmits downlink control information (DCI) including a transmission configuration indication (TCI) field indicating a TCI state applicable to multiple types of channels or signals for uplink (UL) and downlink (DL); and a processor that controls a reception of the multiple types of channels or signals to which the TCI state is applied, after a lapse of specific time from a transmission of HARQ-ACK information transmitting only ACK for the DCI including the TCI field indicating the TCI state, wherein a number of bits of the TCI field when the TCI field indicates TCI states of both the UL and the DL is equal to a number of bits of the TCI field when the TCI field indicates a TCI state of only the DL.

6. A system comprising a terminal and a base station, wherein the terminal comprises:

a receiver that receives downlink control information (DCI) including a transmission configuration indication (TCI) field indicating a TCI state applicable to multiple types of channels or signals for uplink (UL) and downlink (DL); and a processor that applies the TCI state to the multiple types of channels or signals after a lapse of specific time from a transmission of HARQ-ACK information transmitting only ACK for the DCI including the TCI field indicating the TCI state, and the base station comprises:

a transmitter that transmits the DCI; and a processor that controls a reception of the multiple types of channels or signals to which the TCI state is applied, wherein a number of bits of the TCI field when the TCI field indicates TCI states of both the UL and the DL is equal to a number of bits of the TCI field when the TCI field indicates a TCI state of only the DL.

* * * * *